No. 848,848. PATENTED APR. 2, 1907.
C. A. PHILLIPS.
PLOW ATTACHMENT.
APPLICATION FILED SEPT. 26, 1906.
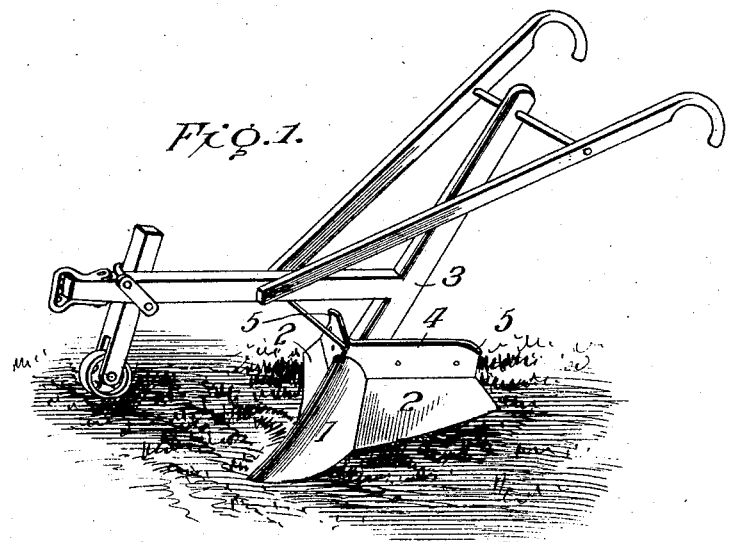
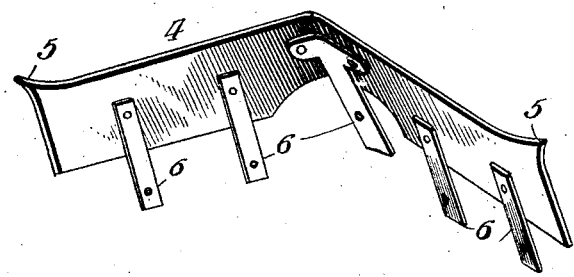
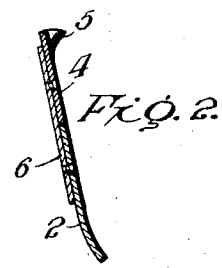
Inventor
Clarence A. Phillips,
Witnesses
By
Attorneys

UNITED STATES PATENT OFFICE.

CLARENCE A. PHILLIPS, OF MIDDLEBURY, VERMONT.

PLOW ATTACHMENT.

No. 848,848.    Specification of Letters Patent.    Patented April 2, 1907.

Application filed September 26, 1906. Serial No. 336,344.

*To all whom it may concern:*

Be it known that I, CLARENCE A. PHILLIPS, a citizen of the United States, residing at Middlebury, in the county of Addison and State of Vermont, have invented certain new and useful Improvements in Plow Attachments, of which the following is a specification.

This invention provides a novel attachment for plows of the type having a wing-shovel, the purpose being to prevent the earth passing over the upper edge of the shovel and wing and to insure turning the dirt back upon the hill.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a perspective view of a wing-shovel plow having the attachment in position. Fig. 2 is a detail view showing the manner of securing the attachment to the plow. Fig. 3 is a perspective view of the attachment.

Corresponding and like parts are referred to in the following description and indicated in all the views of the drawings by the same reference characters.

The attachment is designed for application to plows of the variety having side wings and is adapted to be arranged at the upper end or edge of the shovel and wing or wings, so as to increase the width to an extent to prevent passage of the earth thereover when the plow is in operation, the upper rear corner of the attachment being curved upward to such an extent as to insure throwing of the dirt back upon the hill.

The wing-shovel plow illustrated is of ordinary type and comprises the shovel 1 and wings 2, said parts being secured together and to the plow-stock 3 in the usual way.

The attachment comprises similar blades 4, preferably of steel, each arranged at the upper edge of a wing 2, with its inner end extending over the upper end of the shovel 1, the two blades meeting centrally of the shovel and inclined forwardly and outwardly in conformity to the wings 2 and having their upper rear corners curved outward, as shown at 5, to throw the dirt back upon the hill. The blades 4 may be secured to the wings 2 and to the shovel 1 and to each other in any convenient way, as by means of strap-irons 6, which overlap the joints of the adjacent parts, to which they are bolted or fastened in any manner to admit of the ready removal of the blades when required for any purpose.

Having thus described the invention, what is claimed as new is—

1. In combination with a plow comprising a shovel and a wing, an attachment consisting of a blade arranged at the upper edge of the wing and having its inner end extending over the upper end of the shovel.

2. In combination with a plow comprising a shovel and a wing, an attachment consisting of a blade arranged at the upper edge of the wing and having its inner end extending over the upper end of the shovel, the upper rear corner of the blade being curved forward to throw the dirt back upon the hill.

3. In combination with a plow comprising a shovel and oppositely-disposed wings, an attachment, the same comprising similar blades arranged above the wings, and having their inner ends extending over the upper end of the shovel and meeting on a central line, the upper rear corners of the blades being curved forward to throw the dirt back upon the hill.

In testimony whereof I affix my signature in presence of two witnesses.

CLARENCE A. PHILLIPS. [L. S.]

Witnesses:
LUCIA C. HINCKS,
ALBERT W. DICKENS.